Patented Sept. 8, 1936

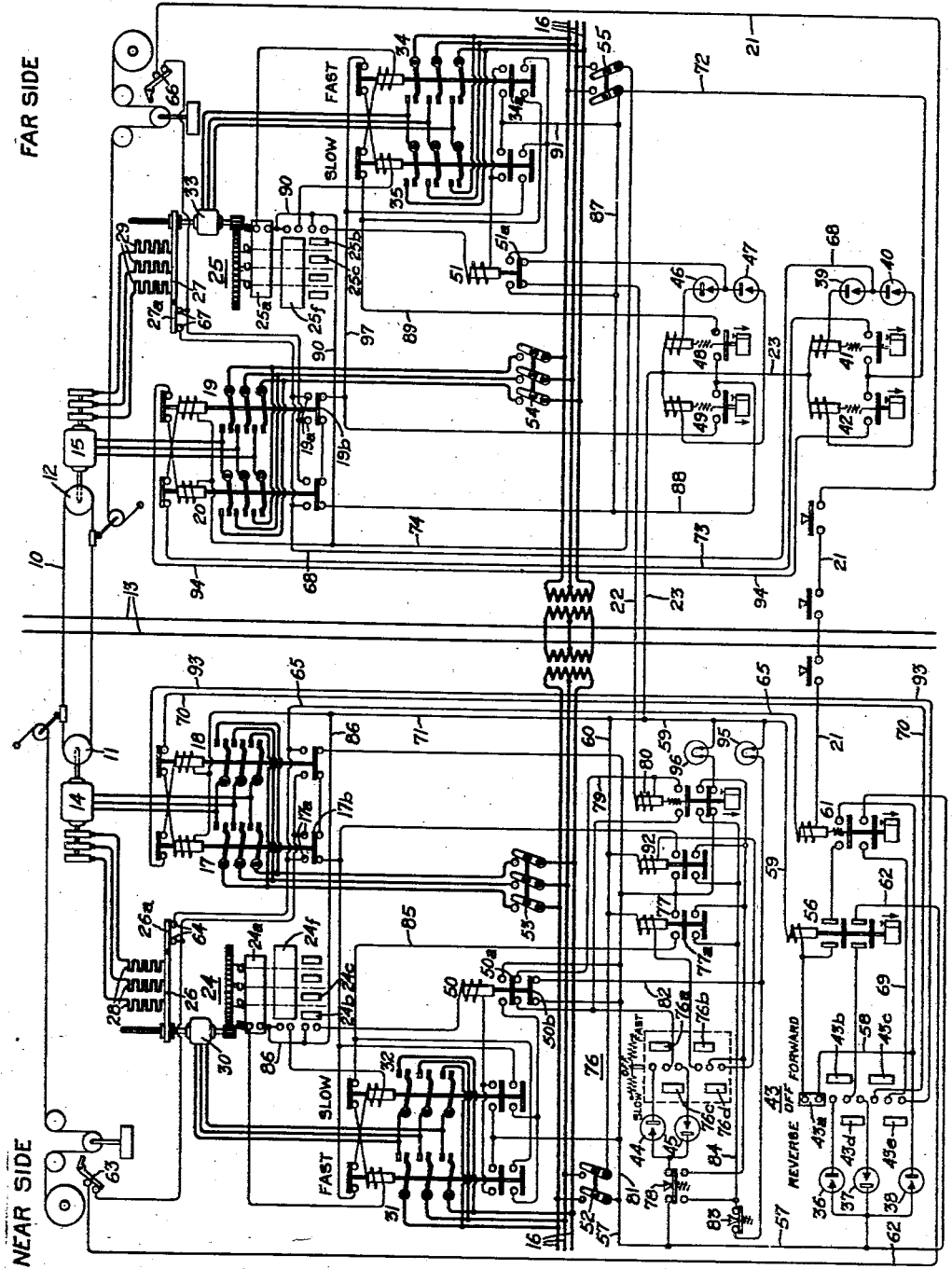

2,053,951

UNITED STATES PATENT OFFICE 2,053,951

CONTROL SYSTEM

Clyde H. Freese, deceased, late of Niskayuna, N. Y., by Ruth Rodkey Freese, executrix, Niskayuna, N. Y., assignor to General Electric Company, a corporation of New York Application October 27, 1934, Serial No. 750,293

15 Claims. (Cl. 172—293)

This invention relates to control systems, more particularly to systems for controlling a plurality of movable objects, and it has for an object the provision of an inexpensive, simple, reliable and improved system of this character.

More specifically, the invention relates to systems for controlling objects which are located at a distance from each other, and a further object is the provision of a satisfactory control in which the number of inter-connecting control conductors is reduced to a minimum.

In carrying the invention into effect in one form thereof, each of a plurality of objects, situated remotely from each other, is provided with an electro-responsive control device, and these devices are under the control of a single, controlling circuit. These control devices are additionally provided with inter-locking means for exercising a control over the control circuit such that all of the controlled objects are caused to operate in substantial correspondence with each other. In a specific embodiment of the invention, each of the controlled objects is driven by suitable driving means, such as an electric motor, and the control devices are arranged to stop the motors in predetermined positions of the controlled objects and to transfer the control of restarting of the motors to the control circuit. The control devices are provided with means which prevent the restarting of the motors until all of the controlled objects have been moved to positions of correspondence, and thus the controlled objects are operated step by step in substantial correspondence with each other.

Another aspect of this invention relates to a motor control system in which a plurality of main driving motors, remotely located from each other, are to be controlled from a common control point. These motors may be alternating current slip ring induction type motors, requiring both primary and secondary control. A further object of this invention is the provision of suitable means, utilizing a minimum number of control conductors between a common control station and the controlled motors for effecting both primary and secondary control of these motors.

In carrying this aspect of the invention into effect in one form thereof, the master speed controlling switches of the main driving motors are operated by suitable means such as by pilot motors, which are controlled to operate step by step in substantial correspondence as set forth in the foregoing description of the broader aspect of the invention. The primary control of the main driving motors is effected by means of a single control circuit including means for controlling the direction of current flow in the circuit together with rectifying devices properly arranged for selectively energizing the reversing contactors of the remote motor in accordance with the operation of a master directional controlling switch.

Additional objects and features are set forth in the specification.

For a better and more complete understanding of the invention, reference should now be had to the following specification and to the accompanying drawing, the single figure of which is a simple, diagrammatical illustration of an embodiment of the invention. In illustrating the invention in one form thereof, it is shown as embodied in a cable spinning control in which an aerial tramway cable 10 is passed around two traction sheaves 11 and 12 by means of which the aerial tramway is driven as the successive layers of the bridge suspension cable are laid. The aerial tramway cable 10 may be utilized for laying the cables of a suspension bridge to be built across a body of water, such as a bay or river represented by the two parallel lines 13. The sheaves 11 and 12 are driven by any suitable driving means, such for example as electric motors 14 and 15, the drive shafts of which are direct connected to the sheaves 11 and 12 respectively. Although these motors may be of any suitable type, they are preferably alternating current slip-ring wound rotor induction motors and are supplied from a suitable source, represented in the drawing by the three supply lines 16. The motor 14 may be connected to the supply source 16 for rotation in either the forward or reverse direction by suitable reversing switching means illustrated as forward and reverse contactors 17 and 18. Similar contactors 19 and 20 are provided for connecting the motor 15 to the source for rotation in the forward and reverse directions respectively.

In the application illustrated, it is clear that the driving motors 14 and 15 should operate at substantially the same speeds and it is, therefore, desirable that the starting, stopping and running operations of these motors should be controlled from a common control station. The primary and secondary control means for each driving motor are preferably arranged adjacent the motor which they control, and thus control conductors between the common control station and the controlling means for each driving motor are necessary. In some instances, the traction sheaves 11 and 12 may be separated from each other by a considerable distance, often in excess of a mile. In such cases, the cost of the control conductors from the common control station to the driving motors is an important item and for this reason it is desirable that the number of control conductors shall be reduced to a minimum. Furthermore, the chances of control cable failure increase in proportion to the number of conductors, and a minimum number of control conductors is therefore desirable. In the arrangement shown, three control wires are utilized between the control station and the remotely located motor. The control wire 21 extends from the control station on the left-hand or near side across the body of water 13 and controls the primary reversing contactors 19 and 20 of the remote driving motor 15. A second control wire 22 extends from the control station to the remote motor and is utilized to control its master speed controlling switch and a third wire 23 is utilized as a return.

The speed controlling master switches of the traction motors 14 and 15 are illustrated as multi-position drum switches 24 and 25 respectively provided with contact means 26 and 27 for controlling the secondary resistances 28 and 29 respectively of the motors 14 and 15, thereby to control their speeds. The master switches 24 and 25 are illustrated as motor-operated switches. The pilot motor 30 is geared to rotate the drum of the switch 24 and is also provided with a suitable driving connection for moving the contact means 26 to short circuit the resistance 28. In this connection, it is pointed out that the structure of the master switches 24 and 25 may be very different from the structure illustrated. Usually the structure and circuit arrangement of these switches is very complex and for this reason the switches 24 and 25 are illustrated conventionally and diagrammatically for the purpose of simplification. Preferably the pilot motor 30 is of the alternating current type and is arranged to be connected to the supply source 16 for operation in either the forward or reverse direction by means of suitable directional switching means illustrated as forward contactor 31 and reverse contactor 32. The forward contactors 31 on the near side and 34 on the far side respectively when energized and closed cause the pilot motors 30 and 33 to rotate the master switches 24 and 25 in such a direction as to increase the speed of the motors 14 and 15 and are, therefore, referred to as the "fast" contactors. The reverse contactors 32 and 35 cause the pilot motors to rotate the master switches in a direction to decrease the speed of the main driving motors and are, therefore, referred to as the "slow" contactors.

In order that both forward and reverse contactors 19 and 20 for the remote traction motor 15 may be controlled by means of the single control conductor 21 from the control station on the near side, the half wave rectifying devices 36, 37 and 38 are included in the circuit of this conductor in parallel relationship with each other on the near side and two similar half-wave rectifiers 39 and 40 are also included in the circuit in parallel relationship with each other on the far side. These half-wave rectifying devices may be of any suitable type but are preferably of the surface contact type such for example as the well-known copper oxide rectifying device. Suitable electro-responsive relay devices 41 and 42, the operating coils of which are respectively included in circuit with the rectifying devices 39 and 40 are provided for controlling the operation of the forward and reverse contactors 19 and 20 of the remote traction motor 15. A suitable master switching means illustrated as a manually operated master switch 43 having forward and reverse positions is provided on the near side for controlling the operation of the relays 41 and 42 on the far side.

For the purpose of controlling both fast and slow contactors 34 and 35 on the far side from the control station on the near side by means of a single conductor 22, two reversely connected half-wave rectifying devices 44 and 45 are connected in the circuit of this conductor in parallel relationship with each other on the near side and similar reversely connected half wave rectifying devices 46 and 47 are connected in the circuit of the conductor 22 in parallel relationship with each other on the far side. These half-wave rectifying devices are preferably of the same type as the rectifying devices 36—40 inclusive. Relay devices 48 and 49 having their operating coils connected in circuit with rectifying devices 46 and 47 respectively on the far side are provided for controlling the fast and slow contactors 34 and 35 respectively. The relays 41, 42, 48, and 49 are preferably copper jacketed for the purpose of providing a time delay in their dropout operation so that they will remain closed for a short interval of time after their energizing circuits have been interrupted. These relays are illustrated conventionally, however, as provided with dash-pots for effecting the time delay in their drop-out operation.

In order to insure the operation of the traction motors 14 and 15 on corresponding speed points of their master switches, positioning relays 50 and 51 are respectively provided in the control apparatus on the near and far sides respectively. These relays are under the respective control of the master switches 24 and 25, and they function to stop the pilot motors 30 and 33 respectively in predetermined positions of the master switches 24 and 25 respectively. These relays 50 and 51 also function to restore control of the restarting of the pilot motors 30 and 33 to control conductor 22, and in addition these relays 50 and 51 are so interlocked with the control conductor 22 that they prevent restarting of the pilot motors until both master switches 24 and 25 have come to rest in predetermined corresponding positions. Thus, if the two master switches do not operate in synchronism, the faster operating switch must always stop when it reaches a predetermined position and wait until the slower operating master switch has reached a corresponding position. It will thus be seen that the control is such as to effect step-by-step operation of the master switches 24 and 25 in substantial correspondence with each other.

With the above understanding of the apparatus and connections and their organization in the completed system, the operation of the system itself will be readily understood from the following detailed description:

It is assumed that the motor operated master switches 24 and 25 are in the first position in which they are illustrated. To place the system in condition for operation, the line switches 52, 53, 54, and 55 and the safe-run switches in the circuit of the conductor 21 are closed. The closing of line switch 52 completes an energizing circuit for the operating coil of under-voltage relay 56. This circuit is traced from the conductor 57, which is connected to the supply line 16, through rectifier 38, conductor 58, upper pair of stationary contacts of traction motor master switch 43, bridged by the movable contact member 43a, operating coil of under-voltage relay 56 and thence by conductors 59 and 60 and line switch 52 to the middle supply line 16. Since the rectifier 38 passes only half-wave rectified current, the under-voltage relay 56 is provided with means for providing a time delay in its drop-out operation. This means is conventionally illustrated as a dash-pot, but preferably the relay is constructed with a copper jacket to provide the necessary time delay action. In responding to energization, relay 56 closes both its contacts. If it is desired to operate the traction motors 14 and 15 in the forward direction the master switch 43 is moved to its right-hand or "forward" position, in which it completes an energizing circuit for the operating coils of under-voltage relay 61 and the forward traction motor relay 41 for the remote traction motor. This circuit extends from the conductor 57, through rectifier 36, third and fourth stationary fingers of master switch 43 bridged by movable contact member 43b, lower contacts of under-voltage relay 56, conductor 62, near side limit switch 63, stationary contacts 64, bridged by contact 26a, conductor 65, coil of under-voltage relay 61, control conductor 21, far side limit switch 66, stationary contacts 67 bridged by movable contact member 27a, conductor 68, rectifier 39, coil of relay 41, and thence by return conductor 23 to conductor 60 and the middle line of the supply source 16. Since the rectifier 39 and the rectifier 36 both conduct current in the same direction, the forward relay 41 is energized. The rectifier 40, however, does not conduct current in the same direction as the rectifier 36 and consequently the reverse relay 42 is not energized at this time, and cannot be energized until the master switch 43 is operated to its reverse position to connect the reversely connected rectifier 37 in circuit. In responding to energization, the under-voltage relay 61 and forward relay 41 close their contacts. In the forward position of the master switch 43, the energizing circuit of under-voltage relay 56 is interrupted. However, since this relay is provided with time delay in its drop-out action, its contacts remain closed until the upper contacts of under-voltage relay 61 close to complete a holding circuit for the operating coil of relay 56 independently of the master switch 43. The lower contacts of relay 61 complete an energizing circuit for the forward contactor 17 of the near side traction motor 14. This circuit is traced from the conductor 57, through lower contacts of relay 61, conductor 69, second and third (from the bottom) stationary fingers of switch 43, bridged by movable contact 43c, conductor 70, upper closed interlocks of reverse contactor 18, operating coil of forward contactor 17 and thence by conductors 71 and 60 to the middle supply line 16. On the far side, the contacts of forward relay 41 in closing complete an energizing circuit for the forward contactor 19, which circuit extends from the supply line 16, through conductor 72, contacts of relay 41, conductor 73, upper closed interlocks of contactor 20, operating coil of contactor 19, conductor 74 to the middle supply line 16. In response to energization both forward contactors 17 and 19 on the near and far sides, respectively, close and connect the traction motors 14 and 15 to the supply source 16 for rotation in the forward direction. Since the multi-position master switches 24 and 25 are on the same speed point, i. e., their first positions, with the entire amount of the resistances 28 and 29 in circuit, the traction motors 14 and 15 commence to rotate at slow speed. In the closed position of the forward contactors 17 and 19, stationary interlock contacts 17a and 19a are respectively bridged by movable interlock contacts 17b and 19b thereby completing a holding circuit across stationary contacts 64 and 67 of the master switches 24 and 25 respectively. This particular feature prevents the directional contactors for the motors 14 and 15 from being energized unless both master switches 24 and 25 are in the first position. Thus, with this interlocking arrangement provided for the primary control, if under-voltage occurs or if any safe-run button is opened while the traction motors are operating, then both traction motors will be de-energized and cannot be restarted until both master switches 24 and 25 have been returned to the first position and the master switch 43 has been returned to its off position to reenergize the under-voltage relay 56.

In order to increase the speed of both traction motors 14 and 15, the spring actuated master switch 76 is moved to its right-hand or "fast" position, to complete energizing circuits for the fast relay 77 on the near side and fast relay 48 on the far side. The energizing circuit for the relay 48 is traced from the conductor 57 through the contacts of normally closed switch 78, which is preferably of the push-button type, rectifier 44, upper pair of stationary fingers of master switch 76 bridged by movable contact member 76a, intermediate stationary contacts of position relay 50 bridged by movable contact member 50a, conductor 79, operating coil of interlocking relay 80, control wire 22, lower stationary contacts of positioning relay 51, bridged by stationary contact 51a, rectifier 46, operating coil of fast relay 48 and thence by the return conductor 23 to the opposite side of the supply source. Interlocking relay 80 and fast relay 48 close in response to energization. Since rectifier 47 does not conduct current in the same direction as rectifier 44, the slow relay 49 is not energized at this time and cannot be energized until master switch 76 is actuated to its left-hand position to connect the reversely connected rectifier 45 in circuit with rectifier 47 and operating coil of relay 49. In the closed position of interlocking relay 80, its lower movable contact completes the energizing circuit for fast relay 77, which circuit is traced from the upper supply line 16 to conductor 81, lower stationary contact of positioning relay 50 bridged by movable contact member 50b, conductor 82, normally closed contacts of switch 83 which is preferably a push-button type switch, conductor 84, intermediate contacts of interlock relay 80 bridged by the lower movable contact member, second and third (from the bottom) contacts of master switch 76, bridged by movable contact member 76b, operating coil of fast relay 77 and thence to the opposite side of the supply source. Fast relay 77 closes in response to energization.

In the closed positions of fast relay 77 on the near side, and fast relay 48 on the far side, energizing circuits are completed for the operating coils of fast contactor 31 on the near side and fast contactor 34 on the far side. The energizing circuit for the fast contactor 31 is traced from the conductor 81 through upper stationary contacts of relay 77 bridged by upper movable contacts 77a, conductor 85, upper closed interlock of slow contactor 32, operating coil of fast contactor 31, upper stationary contacts of master switch 24 bridged by movable segment 24a, conductor 86 and thence by conductors 71 and 60 to the opposite side of the supply source. The energizing circuit for the fast contactor 34 on the far side extends from the upper side of the supply source 16 through switch 55, conductors 87 and 88, contacts of relay 48, conductor 89, upper closed interlocks of slow contactor 35, operating coil of fast contactor 34, upper contacts of master switch 25 bridged by segment 25a, conductor 90 and thence by conductor 74 to the opposite side of the supply source 16. In responding to energization, the fast contactors 31 and 34 close and connect the pilot motors 30 and 33 respectively to the supply source 16.

Pilot motors 30 and 33 now begin to rotate in such a direction as to move the movable contacts 26 and 27 respectively in an upward direction to short circuit the resistances 28 and 29 respectively and thus to increase the speeds of the traction motors 14 and 15.

The pilot motors 30 and 33 will rotate at substantially the same speeds, but in practice one of these motors may rotate slightly faster than the other. This would be undesirable because the master switch driven by the faster operating pilot motor would tend to cause the traction motor controlled thereby to rotate faster than the traction motor controlled by the master switch driven by the slower operating pilot motor. Since both traction motors 14 and 15 are connected to a common load, it is desirable that both shall operate on the same speed points of the master switches and at approximately the same speed. Assuming that the pilot motor 33 rotates slightly faster than the pilot motor 30, the movable contact member 25b of the master switch 25 will bridge its cooperating stationary contacts, slightly before the movable contact member 24b bridges its cooperating stationary contact. As a result, an energizing circuit is completed for the operating coil of the positioning relay 51 extending from the top supply line 16 through switch 55, conductor 91, intermediate stationary contacts of contactor 34 bridged by movable contacts 34a, operating coil of relay 51, stationary contacts of controller 25 bridged by movable contacts 25b and thence by conductors 90 and 74 to the opposite side of the supply source 16. In responding to energization, positioning relay 51 closes its upper contact thereby completing a holding circuit for operating coil of contactor 34 extending from conductor 87, through upper contacts of relay 51, lower contact of contactor 34, operating coil of contactor 34 and thence by conductors 99 and 74 to the opposite side of the supply source. At the same time, the energizing circuit for fast relay 48 previously traced through the lower stationary contacts of relay 51 is interrupted. Relay 48 opens its contact and thus interrupts the energizing circuit for fast contactor 34. The latter, however, remains energized through the holding circuit established by positioning relay 51. Thus at this point in the operation, the control of the fast contactor 34 and thereby the secondary control of the traction motor 15 is taken away from the fast relay 48 and is taken over by the master switch 25 and the positioning relay 51.

Since the operating coil of the interlocking relay 80 is in circuit with the operating coil of the fast relay 48, the opening of the lower contact of positioning relay 51 deenergizes the relay 80. The relay 80 opens in response to deenergization, but the energizing circuit of the fast relay 77 on the near side previously traced through the intermediate stationary contacts of relay 80 is maintained through the independent holding circuit established by its own lower interlock contacts.

Since the pilot motor 30 is operating at a speed only slightly slower than that of pilot motor 33, the movable contact 24b engages its cooperating stationary contacts, a very slight interval of time after the engagement of movable contacts 25b with its cooperating stationary contact and while they are still in engagement with each other. Engagement of the movable contact 24b with its cooperating stationary contacts completes an energizing circuit for the operating coil of the near side positioning relay 50, which circuit is traced from the power conductor 81 through intermediate interlock contacts of fast contactor 31, operating coil of positioning relay 50, stationary contact of master switch 24 bridged by movable contact 24b and thence by conductors 86, 71 and 60 to the opposite side of the supply source. Positioning relay 50 opens its lower contact to interrupt the energizing circuit of fast relay 77 and also opens its intermediate contact further to interrupt the energizing circuit of interlocking relay 80. At the same time, its movable contact 50a engages the upper stationary contact to complete a holding circuit for the fast contactor 31 independently of the contacts of the fast relay 77 which have opened in response to interruption of the energizing circuit of relay 77. The holding circuit for fast contactor 31 extends from power conductor 81 through upper stationary contacts of relay 50, lower interlock contacts of fast contactor 31 and from this point to the opposite side of the supply source as previously traced. Thus, it will be observed that at this point in the operation, the control of the fast contactor 31 and thereby the control of pilot motor 30 and the secondary control of traction motor 14 are taken away from the fast relay 77 and transferred to the master switch 24 and the positioning relay 50.

As the drum switch 25 continues to rotate from position a to position b, the movable contact 25b is moved out of engagement with its cooperating stationary contact thereby interrupting the energizing circuit for positioning relay 51. The movable contact 51a of relay 51 drops out of engagement with its cooperating upper stationary contacts thereby to interrupt the energizing circuit of the fast contactor 34, which opens to disconnect the pilot motor 33 from the supply source 16, thereby stopping the master switch 25 in position b and causing the speed of the traction motor 15 to remain substantially constant for the time being at a value determined by position b of the master switch. The reengagement of the movable contact 51a with its cooperating stationary contact only partially reestablishes the energizing circuit of the fast relay 48 and the interlocking relay 80, since this circuit is still open at the intermediate stationary contact of positioning relay 50 on the near side. The master switch 24 continues to rotate toward position b. When it reaches this position, the movable contact 24b has moved out of engagement with its cooperating stationary contact thereby to interrupt the energizing circuit for the positioning relay 50, whose movable contact 50a descends out of engagement with its cooperating upper stationary contact to interrupt the holding circuit for the fast contactor 31 which in turn opens to disconnect the pilot motor 30 from the supply source 16 and to stop the master switch 24 in position b which corresponds with position b of the master switch 25 on the far side. The traction motors 14 and 15 are now operating at substantially the same speed on corresponding speed points of their master switches. The movable contact 50a reengages its cooperating intermediate stationary contact to recomplete the previously traced energizing circuit for interlocking relay 80 and fast relay 48 on the far side, whilst movable contact 50b engages its cooperating lower stationary contacts to reestablish the previously traced energizing circuit for the fast relay 77 on the near side. The relays 77 and 48 respond to restart the pilot motors 30 and 33 in the manner previously described and the master switches 24 and 25 are actuated from position b to position c.

As the master switches again approach predetermined positions in which movable contacts 24c and 25c respectively engage their cooperating stationary contacts, the control is again taken away from the fast relays 77 and 48 and is transferred to the master switches 24 and 25 and position relays 50 and 51. When the faster operating master switch reaches its c position, its pilot motor is stopped until the slower operating master switch reaches its corresponding position, and the control is retransferred to the fast relays 77 and 48.

When the traction motors 14 and 15 are operating at the desired speed, the spring actuated master switch 76 is returned to its central or "off" position in which the energizing circuits for the fast relay 77, the interlocking relay 80 and the fast relay 48 are interrupted which in turn open the fast contactors 31 and 34 to stop the pilot motors 30 and 33. The traction motors 14 and 15 continue to operate at a substantially constant speed, the value of which is determined by the positions of the master switches 24 and 25. It is to be noted that the segments 24a and 25a serve as limit switches for automatically stopping the pilot motors 30 and 33 when the master switches 24 and 25 reach their last positions.

If it is desired to reduce the speed of the traction motors 14 and 15, the spring actuated master switch 76 is operated to its left-hand or "slow" position in which energizing circuits are completed for the slow relay 49 on the far side and the slow relay 92 and interlocking relay 80 on the near side. The circuit for slow relay 49 is traced from the power conductor 57 to normally closed contacts of the push-button 78, rectifier 45, second and third (from the top) stationary contacts of master switch 76 bridged by movable contact 76c, intermediate contact of positioning relay 50 bridged by contact 50a, conductor 79, operating coil of interlocking relay 80, control conductor 22, normally closed contact of positioning relay 51, rectifier 47, operating coil of slow relay 49 to return conductor 23. Since rectifier 46 does not conduct current in the direction in which rectifier 45 is conducting, the fast relay 48 is not energized at this time. The circuit for the slow relay 92 on the near side is readily traced from conductor 81 through lower normally closed contacts of positioning relay 50, conductor 82, normally closed contacts of switch 83, conductor 84, intermediate contact of interlocking relay 80 (closed in response to energization), lower pair of contacts of master switch 76 bridged by movable contact 76d, operating coil of slow relay 92 to conductor 60 and the opposite side of the supply source. Slow relays 92 and 49 now close their contacts to complete energizing circuits for the slow contactors 32 and 35 on the near and far sides respectively, thereby causing pilot motors 30 and 33 to rotate the master switches in the reverse direction and reinsert the resistances 28 and 29 in the secondary circuits of the traction motors 14 and 15 to reduce their speed. As in the previously described operation, the master switches 24 and 25 are operated step by step in substantial synchronism with each other. The circuits established for providing this step by step operation for the speed decreasing operation are similar to those already described for the speed increasing operation and are obvious from the previous description.

Thus, the interlocking arrangement between the master switches on the near and far sides is such that if the two master switches are not operating in synchronism, the faster operating switch must always stop when it reaches each of a plurality of predetermined positions and wait until the slower operating master switch reaches a corresponding position. This is provided by the positioning relay 51 on the far side preventing the directional relays 77 and 92 on the near side from being energized and similarly by positioning relay 50 on the near side preventing the relays 48 and 49 on the far side from being energized as long as the positioning relays are energized.

If it is desired to operate the traction motors 14 and 15 in the reverse direction, the directional master switch 43 is moved to its left-hand or reverse position. In the central or "off" position of master switch 43, the previously described energizing circuit for under-voltage relay 56 is completed and this relay is closed. In the reverse position of the master switch 43, the energizing circuits are established for the reverse relay 42 on the far side and reverse contactor 18 on the near side. The circuit for the reverse relay 42 on the far side is traced from power conductor 57 through rectifier 37, contacts of master switch 43 bridged by movable contact 43d and thence by the circuit previously traced for the forward relay 41 to the points between rectifiers 39 and 40 at the far side, through rectifier 40, operating coil of reverse relay 42 and thence to the return conductor 23. Undervoltage relay 61 and reverse relay 42 close to complete energizing circuits for reverse contactor 18 on the near side and reverse contactor 20 on the far side, respectively. The circuit for contactor 18 extends from the power conductor 57 through lower closed contacts of under-voltage relay 61, lower pair of contacts of master switch 43 bridged by movable contact 43e and thence by conductor 93 and normally closed upper interlocks of forward contactor 17, through operating coil of reverse contactor 18, and thence by conductors 71 and 60 to the opposite side of the supply source. The energizing circuit for the reverse contactor 20 is traced from the upper supply line 16 through conductor 72 and contacts of reverse relay 42 through conductor 94 and upper normally closed interlock of forward contactor 19, through operating coil of reverse contactor 20 and thence by conductor 74 to the opposite side of the supply source. Since rectifier 39 does not conduct current in the same direction as rectifier 37, the forward relay 41 cannot be energized at this time. The remaining operations are the same as those described for the forward operation.

Indicating lamps 95 and 96 are provided at the control station for respectively indicating whether the near side master switch 24 and the far side master switch 25 respectively are operating properly. The circuit for the near side indicating lamp 95 extends from the upper supply line 16 to conductor 81, through lower stationary contact of positioning relay 50, through conductor 82, lamp 95 and conductors 59 and 60 to the opposite side of the supply source. The circuit for far side indicating lamp 96 is traced from power conductor 61 through lower contacts of relay 80 and lamp 96 to the opposite side of the supply source. When the master switch 24 is at points between its predetermined positions, positioning relay 50 is deenergized and the circuit for lamp 95 is completed. Similarly when the master switch 25 on the far side is at points in between predetermined positions, positioning relay 51 and consequently interlocking relay 80 are deenergized so that the circuit for the lamp 96 is completed. This feature is desirable because it gives the operator a visual indication of the operation of both master switches 24 and 25.

When both traction motors 14 and 15 are deenergized, the master switches 24 and 25 are automatically returned to their off position provided the control switch 76 is in the off position. For example, if the directional master switch 43 is moved to its central off position from either of its operating positions to deenergize the directional contactors for the traction motors at a time when the master switches 24 and 25 are on any speed points beyond their first points, the slow contactors 32 and 35 are energized. With both directional contactors 17 and 18 open, the energizing circuit for the slow contactor 32 is traced from the upper supply line 16, through conductor 81, lower interlocks of contactors 18 and 17 in series, upper interlocks of fast contactor 31, operating coil of slow contactor 32, intermediate pair of stationary contacts of master switch 24 bridged by segments 24r and thence by conductors 86, 71 and 60 to the opposite side of the supply source. A similar circuit for the slow contactor 35 on the far side is traced from upper supply line 16 through conductor 87, lower normally closed interlocks of contactors 20 and 19 in series, conductor 97, upper interlocks of fast contactor 34, operating coil of slow contactor 35, intermediate stationary contacts of drum switch 25 bridged by movable contacts 25r and thence by conductors 90 and 74 to the opposite side of the supply source. Slow contactors 32 and 35 close and connect pilot motors 30 and 33 respectively to rotate the master switches 24 and 25 toward their low speed position. When the master switches 24 and 25 reach their low speed positions, the energizing circuits for the operating coils of the slow contactors 32 and 35 are respectively interrupted by contact segments 24r and 25r and the contactors open to disconnect and stop the pilot motors 30 and 33. Thus, the master switches 24 and 25 are restored to their first position when the traction motors 14 and 15 are deenergized and thus the system is restored to a reset position.

In addition, means are provided for operating either of the master switches 24 or 25 independently of the other. This feature is provided by push button switches 76 and 83. If the push-button switch 76 is depressed into engagement with its lower cooperating stationary contacts, the control circuits for the far side, previously traced through the upper stationary contacts are interrupted whilst the control circuit is established through the lower stationary contact by means of which the near side pilot motor 30 and drum switch 24 can be operated independently. Similarly if push-button 83 is depressed out of engagement with its cooperating stationary contacts, the control circuits for the near side pilot motors 30 previously traced through these contacts is interrupted and the far side pilot motor 33 and drum switch 25 can be independently operated by means of the control circuit extending through the upper stationary contacts of push button switch 76.

Although in accordance with the provisions of the patent statutes, this invention is described as embodied in concrete form, it will be understood that the apparatus and connections shown and described are merely illustrative and that the invention is not limited thereto since alterations and modifications will readily suggest themselves to persons skilled in the art without departing from the true spirit of this invention and the scope of the annexed claims.

What is claimed as new and desired to secure by Letters Patent of the United States, is:—

1. A control system comprising a plurality of controlled objects, a common control circuit therefor, a separate electro-responsive control device connected with each of said objects, means for selectively controlling the direction of operation of said objects and interlock means in said circuit controlled by said control devices for effecting operation of said objects in the selected direction in substantial correspondence with each other.

2. A control system comprising a plurality of movable objects, a control circuit therefor, a separate control device in said circuit for each of said objects, means for selectively controlling the direction of movement of said objects, and means responsive to the positions of said objects for controlling said control devices to effect movement of said objects in the selected direction in substantial correspondence with each other.

3. In a control system for a plurality of movable objects, a common control circuit for said objects, a plurality of electro-responsive devices in said circuit, one associated with each of said objects for effecting movement thereof, means for selectively controlling the direction of movement of said objects and a plurality of relays, one associated with each of said movable objects and controlled by the position of its associated object for controlling said electro-responsive devices to effect movement of said objects in the selected direction in substantial correspondence with each other.

4. A control system for a plurality of movable objects comprising a separate driving means for each of said objects, a common control circuit for said driving means, a directional controller for one of said driving means, means connected to said circuit and actuated by said controller for controlling the direction of operation of the other of said driving means, means responsive to a predetermined amount of movement of one of said objects for stopping its associated driving means, means responsive to a predetermined amount of movement of another of said objects for stopping its associated driving means and cooperating with said first mentioned position responsive means for restarting said driving means.

5. In a control system in which two movable objects are simultaneously operated, separate driving means for each of said objects, a common control circuit, a directional controller for one of said driving means, means included in said circuit and actuated by said controller for controlling the direction of operation of the other of said driving means, means responsive to movement of the faster moving object to a predetermined position for stopping said faster moving object at said positions, and means responsive to movement of the slower moving object to a corresponding predetermined position for stopping said slower moving object and cooperating with said first mentioned position responsive means for restarting both said objects in said selected direction.

6. A control system in which two objects are moved simultaneously comprising separate driving means for each of said objects, a control circuit common to both said driving means, a relay responsive to the movement of the faster moving object to predetermined positions for stopping its driving means, a relay responsive to movement of the slower moving object to corresponding predetermined positions for stopping its driving means, and an interlocking relay in said circuit actuated by both said position responsive relays when said objects are in corresponding predetermined positions for restarting said driving means so as to cause said objects to operate in substantial correspondence with each other.

7. A control system in which two objects remotely situated with respect to each other are simultaneously moved, comprising separate driving motors for each of said objects, individual starting and stopping means for each of said motors and a common control circuit therefor, a relay responsive in predetermined positions of the faster moving object for actuating the stopping means for its driving motor, a relay responsive in predetermined positions of the slower moving object for actuating the stopping means for its driving motor and interlock means in said control circuit controlled by said relays only when said objects are in said corresponding predetermined positions for controlling said circuit to actuate said starting means thereby to provide step by step operation of said objects in substantial correspondence with each other.

8. A control system in which two remotely situated objects are moved simultaneously comprising individual driving motors for said objects, a common control circuit for said motors, a pair of control relays in said circuit, one for each of said motors, a contactor for each of said motors controlled by each of said relays, means responsive in a predetermined position of the faster moving object for establishing a holding circuit for the contactor controlling its motor and rendering its relay ineffective and responsive in a second position for stopping and retransferring the control of said contactor to said relay, and means responsive in a predetermined position of the slower moving object for establishing a holding circuit for the contactor controlling its motor and rendering its relay ineffective and preventing restarting of the motor for said faster moving object until said second object has moved to a position corresponding to said second position and responsive in said corresponding position for returning control of said contactor for its motor to its control relay.

9. A control system in which two objects remotely situated with respect to each other are controlled from a common control station, comprising individual driving motors for each of said objects, a common control circuit for each of said motors, electroresponsive means associated with each of said motors for controlling the direction of rotation thereof, means for energizing said electroresponsive means for operation of said motors in a selected direction comprising a pair of reversely connected rectifying devices associated with each of said objects and included in said circuit and means for selectively energizing one rectifier of each of said pairs, and means responsive in predetermined positions of said objects to take control of said motors from said circuit and operable in certain other corresponding positions to stop said motors and to return control of the restarting thereof to said circuit.

10. A control system for a plurality of motors remotely situated with respect to each other comprising directional switching means for each of said motors, a common control circuit for said motors, means for actuating the switching means for one of said motors to effect rotation thereof in a selected direction comprising a pair of reversely connected rectifying devices associated with each of said motors and included in said circuit and a controller for selectively actuating corresponding rectifying devices of each of said pairs, said controller being provided with means for controlling the actuation of the switching means for the other of said motors to effect rotation thereof in a corresponding direction, individual multi-position switching means actuated by each of said motors for taking control of said directional switching means from said circuit in predetermined positions of said multi-position means to stop said motors and for returning the control of the restarting of said motors to said circuit, and means controlled by said multi-position switching means for preventing restarting of said motors until all of said multi-position switching means are in corresponding positions.

11. A motor control system comprising a plurality of motors, directional switching means for each of said motors, a common control circuit therefor, a directional controller and means controlled thereby for selectively actuating the directional switching means of one of said motors, means included in said circuit and actuated by said controller for selectively actuating the directional switching means of the other of said motors, a plurality of multi-position switching devices, one associated with each of said motors and actuated thereby for taking over control of said motors from said circuit and for stopping said motors in predetermined positions of said switches and returning the control of restarting said motors to said circuit and means controlled by said switches for preventing restarting of each of said motors until all of said switches are in corresponding positions.

12. A motor control system comprising a plurality of movable objects, an individual motor for driving each of said objects, directional contactors for each of said motors a common control circuit for said contactors, a relay having its operating coil in said circuit for controlling each of said contactors, means for taking over control of said contactors from said relays to stop said motors in successive predetermined positions of said objects and to retransfer the control of said contactors for restarting said motors to said relays comprising a plurality of multi-position switching devices each actuated by a corresponding one of said motors and a separate relay controlled by each of said switching devices and contacts in said circuit actuated by each of said separate relays for preventing restarting any of said motors until all of said objects are in corresponding positions so that all of said motors operate step by step in substantial correspondence with each other.

13. A motor control system comprising a plurality of motors remotely situated with respect to each other, forward and reverse switching means for each of said motors, a master switch associated with one of said motors, a pair of reversely connected rectifying devices respectively connected in circuit with the forward and reverse switching means of a remote motor, a single control circuit from said master switch to the forward and reverse switching means of said remote motor, reversely connected rectifying devices in circuit with said master switch providing for selective operation of the forward and reverse switching means of said remote motor in response to operation of said master switch, an individual multi-position master switch for each of said motors and actuated thereby for stopping said motors in predetermined positions of said multi-position switches and subsequently transferring control of restarting said motors to said circuit, and means in said circuit controlled by said multi-position switches for preventing restarting of said motors until all of said multi-position switches are in corresponding positions.

14. A motor control system comprising a pair of main driving motors remotely located with respect to each other, a multi-position master switch connected with each of said motors for controlling its speed, an individual pilot motor for operating each of said switches to control the speed of said main driving motors, a common control circuit for controlling the starting of said pilot motors, directional switching means controlled by said circuit for controlling the direction of rotation of said pilot motor to increase and decrease the speed of said main driving motors, switching means controlled by said master switches for taking over control of said pilot motors from said circuit to stop said motors and to retransfer control of the restarting of said pilot motors to said circuit in predetermined positions of said multi-position switches and means for preventing restarting of said pilot motors until said multi-position switches are in corresponding positions whereby said master switches are operated step by step in substantial correspondence.

15. A motor control system comprising a pair of main driving motors remotely located with respect to each other, a multi-position master switch for controlling the speed of each of said motors, an individual pilot motor for driving each of said master switches, a common control circuit for said pilot motors, means for simultaneously controlling the direction of rotation of said pilot motors to increase or decrease the speeds of said main motors, electro-responsive switching means operable in predetermined positions of said master switches for taking over control of said pilot motors from said circuit to stop said motors and subsequently to restore control of the restarting of said pilot motors to said circuit, and contacts in said circuit controlled by electro-responsive switching means for effecting restarting of said pilot motors only after all of said master switches have been operated to corresponding positions thereby providing step by step operation of said master switches in substantial correspondence and operation of said main driving motors on corresponding speed points.

RUTH RODKEY FREESE,
*Executrix of the Estate of Clyde H. Freese, Deceased.*